United States Patent
Ishikawa

(10) Patent No.: US 9,874,861 B2
(45) Date of Patent: Jan. 23, 2018

(54) POSITION CONTROL APPARATUS AND METHOD FOR REDUCING CALCULATION TIME AND DETECTING AN ENCODE ERROR OF AN INCREMENTAL SIGNAL

(71) Applicant: CANON KABUSHIKI KAISHA, Tokyo (JP)

(72) Inventor: Daisuke Ishikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 562 days.

(21) Appl. No.: 14/599,156

(22) Filed: Jan. 16, 2015

(65) Prior Publication Data
US 2015/0205303 A1    Jul. 23, 2015

(30) Foreign Application Priority Data
Jan. 20, 2014  (JP) .................................. 2014-007761

(51) Int. Cl.
G05B 19/18    (2006.01)
G05B 15/02    (2006.01)
G05B 19/402   (2006.01)

(52) U.S. Cl.
CPC .......... *G05B 15/02* (2013.01); *G05B 19/402* (2013.01); *G05B 2219/45178* (2013.01)

(58) Field of Classification Search
None
See application file for complete search history.

(56) References Cited

U.S. PATENT DOCUMENTS

2009/0161233 A1*  6/2009  Kobayashi ........... G01B 11/026
                                                      359/697

FOREIGN PATENT DOCUMENTS

JP           5-272988 A    10/1993

* cited by examiner

*Primary Examiner* — Adam Lee
(74) *Attorney, Agent, or Firm* — Canon USA, Inc., IP Division

(57) ABSTRACT

A controller calculates an absolute position of an object based on at least three position detection signal. In performing position control of an object using a position calculation result, the controller controls a position of the object using a calculation result based on a first position detection signal. Further, in a case where a predetermined relation is not established between the calculation result based on the first position detection signal and a calculation result based on the first and a second position detection signals, the controller calculates an absolute position, and corrects the calculation result based on the first position detection signal using the calculated absolute position.

14 Claims, 9 Drawing Sheets

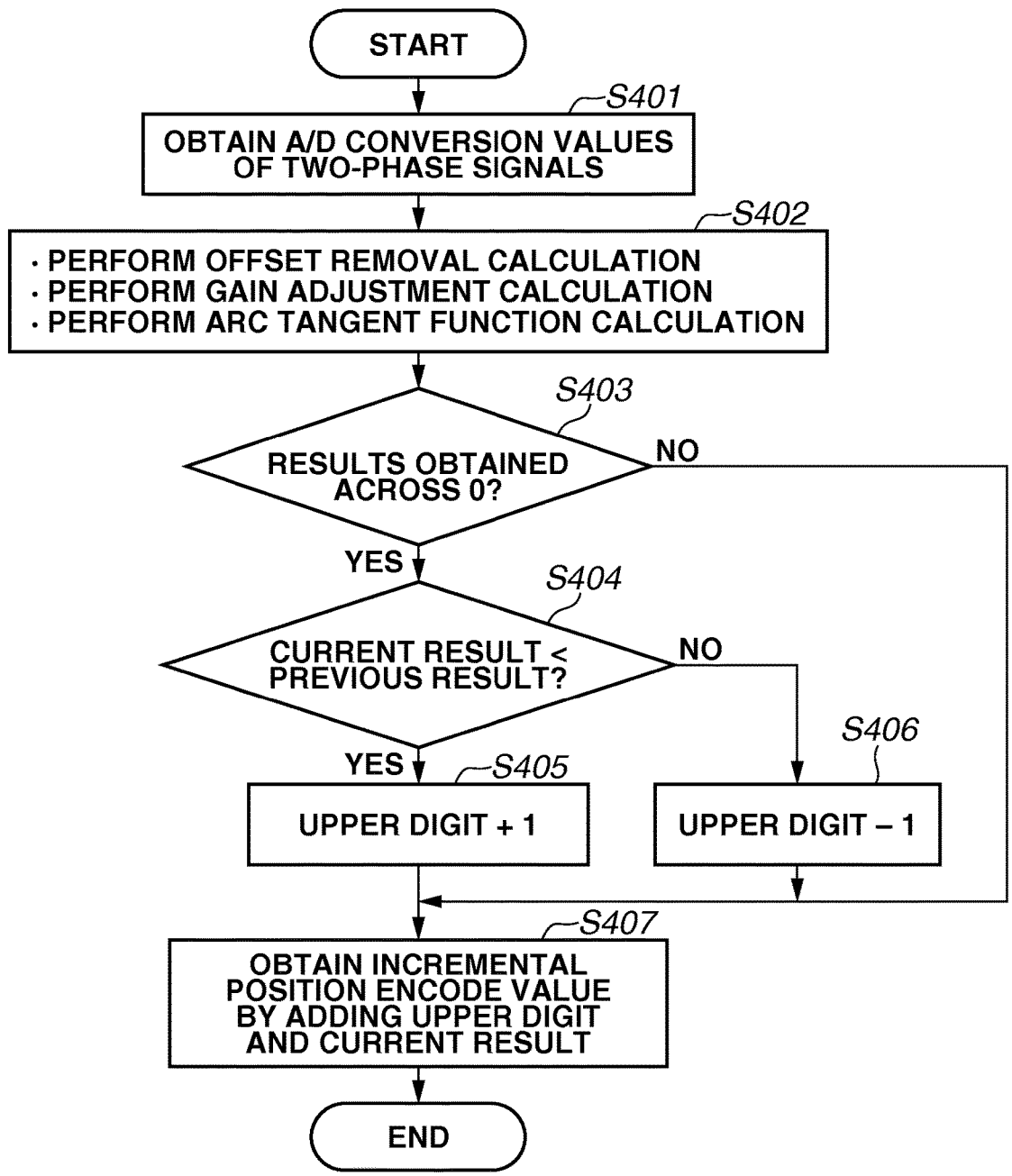

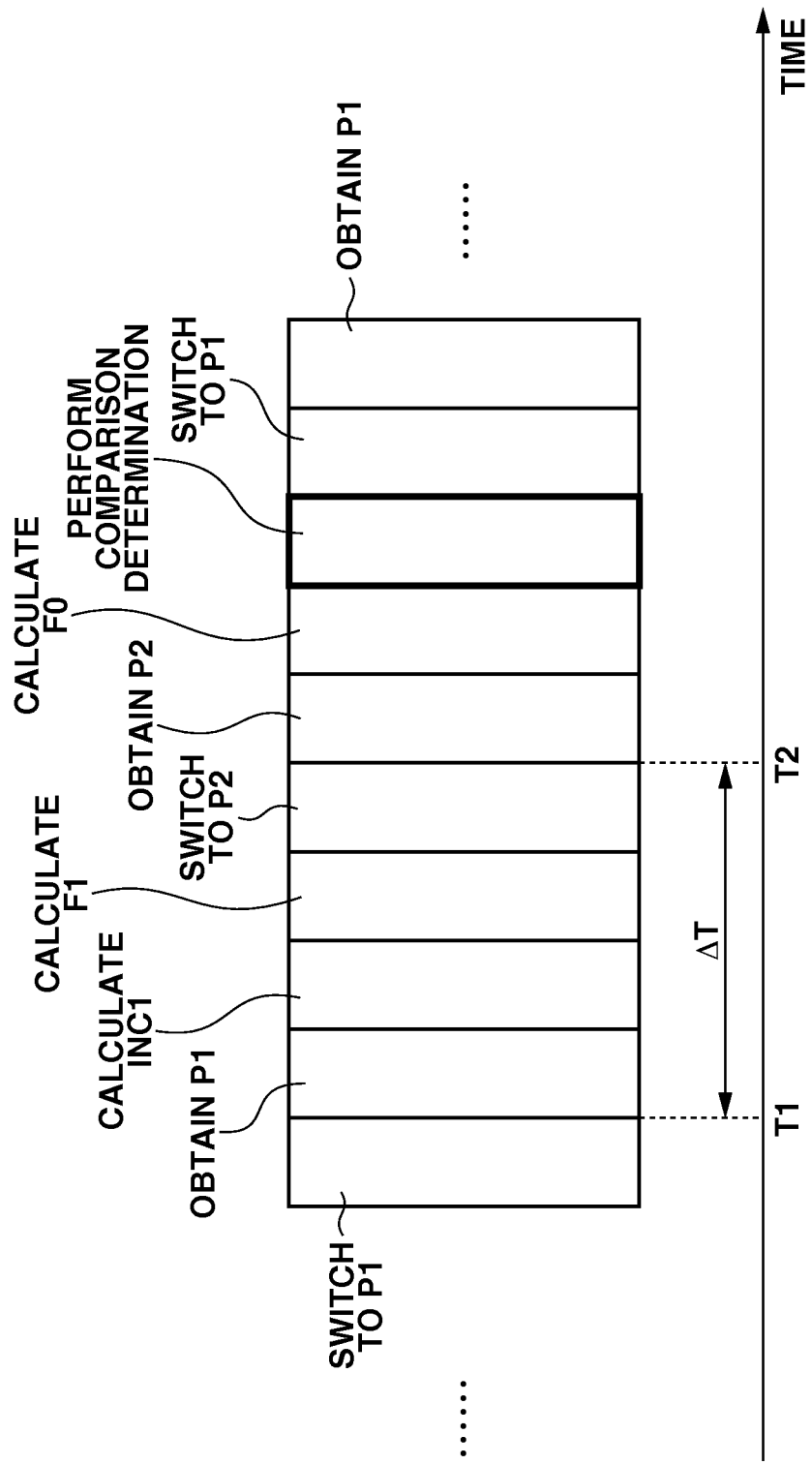

POSITION CONTROL APPARATUS AND METHOD FOR REDUCING CALCULATION TIME AND DETECTING AN ENCODE ERROR OF AN INCREMENTAL SIGNAL

BACKGROUND OF THE INVENTION

Field of the Invention

The present invention relates to a position control apparatus and a method for a position control target such as a focus lens.

Description of the Related Art

Conventionally, there has been generally known a technique (i.e., an incremental counter) for detecting a position of a position control target by holding one incremental signal in a single sample hold circuit and detecting a relative position with reference to a certain position. An example of such a method is as follows. A scale pattern such as a magnetic pattern or a light reflection pattern is attached in a moving direction of an object. A magnetic signal or a light reflection signal according to the position of the scale pattern is then obtained, so that two periodic signals having different phases (hereinafter, referred to as two-phase signals) are generated, and the position is calculated. Further, there has been an absolute encoder which simultaneously holds three incremental signals in three sample hold circuits (refer to Japanese Patent Application Laid-Open No. 5-272988).

In a system of the incremental counter, which has been described above as a conventional art, if the position control target greatly moves during one sample hold period due to an impact or the like, the following may occur. It may become impossible to determine a movement direction and a movement amount obtained in current and previous samplings. In such a case, a relation between the position of the object and an incremental count value becomes undeterminable, and an "encode error" in which a wrong position is calculated may occur. If the encoder error once occurs, it is necessary to redetect a reference position and initialize an increment count.

Further, according to the technique discussed in Japanese Patent Application Laid-Open No. 5-272988, it is necessary to connect each of a plurality of incremental signals to a plurality of sample hold circuits respectively corresponding thereto. The number of signal lines thus becomes large in the position control apparatus using such an absolute encoder. In view of the foregoing, pitch switching control is performed so as to output the incremental signals having different periods to the same signal line, so that the number of signal lines can be decreased.

In such a case, an absolute position of the object is calculated by using the plurality of incremental signals having different periods. However, in a state in which the object is moving, detection timings of the plurality of incremental signals are deviated. For this reason, in order to correctly detect the absolute position, it is necessary to obtain the plurality of incremental signals having different periods in a state where the object remains at rest. Further, the absolute position of the object is calculated using a plurality of signals obtained by performing switching control of the incremental signals. So, it may take time for each calculation of an absolute position, and a processing load of a calculating device may increase.

SUMMARY OF THE INVENTION

The present invention is directed to a position control apparatus and a method capable of reducing a calculation time as compared to the conventional art, and detecting an encode error of an incremental signal.

According to an aspect of the present invention, a position control apparatus includes a signal generation unit configured to generate at least three position detection signals which have different periods and change according to movement of a position control target, a signal selection unit configured to switch between the position detection signals, and output the position detection signals to one or more signal lines less than the position detection signals in number, a first calculation unit configured to calculate a relative position of the position control target using a first position detection signal among the position detection signals, a second calculation unit configured to calculate a relative position of the position control target using a second position detection signal and the first position detection signal among the position detection signals, a third calculation unit configured to calculate an absolute position of the position control target using at least three position detection signals among the position detection signals, and a controller configured to drive a driving unit and control a position of the position control target, using a position calculation result of the position control object. The controller controls a position of the position control target using a position calculation result of the first calculation unit, and in a case where a predetermined relation is not established between position calculation results of the first calculation unit and the second calculation unit, causes the third calculation unit to calculate the absolute position, and corrects the position calculation result of the first calculation unit using a position calculation result of the third calculation unit.

According to another aspect of the present invention, a position control method includes switching between at least three position detection signals which have different periods and change according to movement of a position control target, and outputting the position detection signals to one or more signal lines less than the position detection signals in number, performing first calculation of a relative position of the position control target using a first position detection signal among the position detection signals, performing second calculation of a relative position of the position control target using a second position detection signal and the first position detection signal among the position detection signals, performing third calculation of an absolute position of the position control target using at least three position detection signals among the position detection signals, and controlling a position of the position control target using a position calculation result of the position control target. In the controlling, a position of the position control target is controlled using a position calculation result of the first calculation, and in a case where a predetermined relation is not established between position calculation results of the first calculation and the second calculation, the third calculation is performed and the position calculation result of the first calculation is corrected using a position calculation result of the third calculation.

Further features of the present invention will become apparent from the following description of exemplary embodiments with reference to the attached drawings.

BRIEF DESCRIPTION OF THE DRAWINGS

FIG. 4 is a flowchart illustrating incremental position calculation according to the exemplary embodiment.

FIG. 9 illustrates a time chart according to the exemplary embodiment.

DESCRIPTION OF THE EMBODIMENTS

According to an exemplary embodiment of the present invention, in position control of an object, it is determined whether a predetermined relation (e.g., a phase relation) is established between a relative position of the object that is calculated using one of two position detection signals having different periods and a relative position of the object that is calculated using both of the two position detection signals. If the predetermined relation is not established between the relative positions, the calculation result of the relative position of the object that is obtained using one of the two position detection signals is corrected by using the calculation result of an absolute position that is obtained by the calculation using at least three position detection signals. Such a process does not require extremely frequent calculation of an absolute position. As a result, an issue of processing time increase can be solved for the following reasons. In an encoder which outputs incremental signals having different periods to signal lines by performing pitch switching control, the processing time required for calculating the absolute position using at least three position detection signals obtained by switching becomes long. Further, if the predetermined relation is not established between the relative positions, the calculation result of the relative position of the object that is obtained using one of the two position detection signals is corrected by calculating the absolute position. Occurrence of the encode error can thus be prevented. There can be various combinations of the first position detection signal and the second position detection signal, and the signals may be of adjacent or non-adjacent periods. Nevertheless, since the time required for switching between the adjacent signals and obtaining these signals can be shorter, it is desirable to use the signals of adjacent periods. For example, the first position detection signal is a position detection signal which changes with the shortest period, and the second position detection signal is a position detection signal which changes with the second shortest period. Further, an example of the predetermined relation is a predetermined phase relation. In such a case, the phase of the relative position of a short stroke that is calculated using one of the two position detection signals is obtained in a long stroke of the relative position that is calculated using both of the two position detection signals. The relation (e.g., a phase difference) between the obtained phase and the phase of the relative position of the long stroke is used as the predetermined relation.

Figure 1:
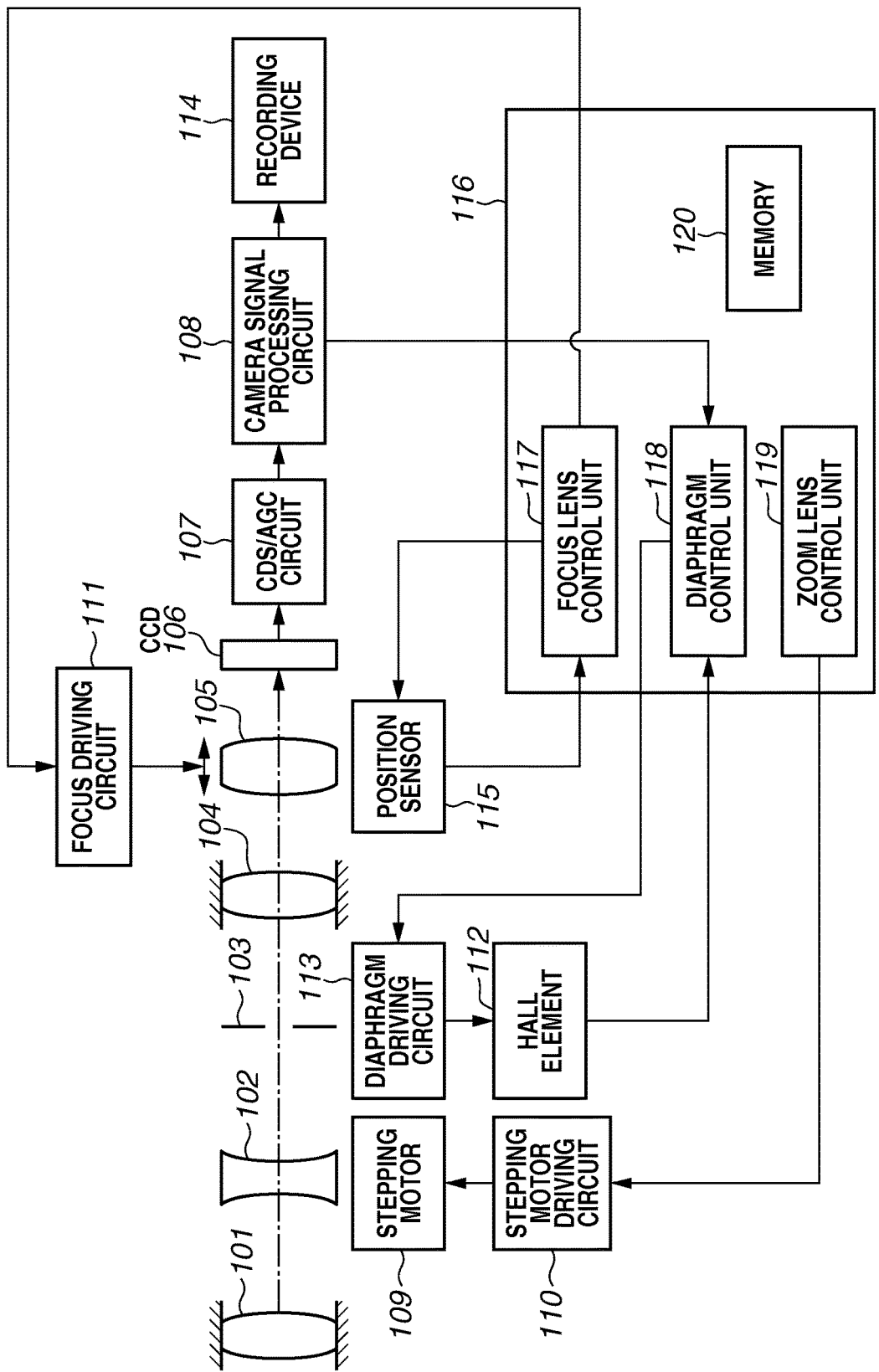
FIG. 1 is a block diagram illustrating an example of an imaging apparatus according to an exemplary embodiment of the present invention.

FIG. 1 illustrates a configuration of an imaging apparatus (i.e., a video camera) to which a position control apparatus according to an exemplary embodiment of the present invention is applied. In the present exemplary embodiment, control of a focus lens of the video camera will be described as an example. However, the present invention is applicable to any apparatus performing position control. Referring to FIG. 1, the imaging apparatus includes a first fixed lens 101, a zoom lens 102, and a diaphragm 103 in an order from an object side of the imaging apparatus (i.e., a left side in FIG. 1). The zoom lens 102 moves in an optical axis direction to perform zooming. The imaging apparatus further includes a second fixed lens 104 and a focus compensator lens (hereinafter referred to as a focus lens) 105 having a function of correcting the movement of a focal plane caused by zooming, and a focusing function. The first fixed lens 101, the zoom lens 102, the diaphragm 103, the second fixed lens 104, and the focus lens 105 constitute an imaging optical system.

An image sensor 106 is a photoelectric conversion element such as a charge-coupled device (CCD) sensor or a complementary metal oxide semiconductor (CMOS) sensor. A correlated double sampling/automatic gain control (CDS/AGC) circuit 107 samples an output from the image sensor 106 and performs gain adjustment. A camera signal processing circuit 108 converts an output signal from the CDS/AGC circuit 107 to a signal compatible with a recording apparatus 114 to be described below. A stepping motor driving circuit 110 drives a stepping motor 109 which serves as a driving source for driving the zoom lens 102. The stepping motor 109 is meshed with a feed screw shaft which is an output shaft. The stepping motor 109 is driven and the feed screw shaft is rotated, whereby the mesh between the feed screw shaft and a rack drives the zoom lens 102 in the optical axis direction.

The stepping motor 109 drives the zoom lens 102 to a target position as follows. First, when the imaging apparatus is activated, the lens is set at a position serving as a position control reference (i.e., a reference position). A driving signal having the number of pulses necessary for moving the lens from the reference position to the target position is then input to the stepping motor 109. The imaging apparatus is therefore provided with a reference position sensor for detecting whether the zoom lens 102 is positioned at the reference position. According to the present exemplary embodiment, the reference position sensor is formed of a photo-interrupter in which a light emitting element and a light receiving element are integrated. A light-shielding member formed on a lens holding frame enters between the light emitting element and the light receiving element of the photo-interrupter to block light emitted from the light emitting element to the light receiving element. As a result, it is detected that the zoom lens 102 is positioned at the reference position. The light shielding member is set to have such a shape that zone detection for detecting a telephoto side or a wide angle side of the zoom lens 102 can be performed. According to the present exemplary embodiment, a driving method of the steeping motor is not specifically limited, and a 1-2 phase driving method, a 2-2 phase driving method, or a micro-step driving method may be employed.

The diaphragm unit 103 includes a diaphragm circuit (a diaphragm driving circuit) 113 including a galvano-type actuator (not illustrated), a diaphragm blade open/close-driven by the actuator, and a position detection element 112 (i.e., a hall element) which detects an open/close state of the diaphragm. An electric signal from the image sensor 106 (e.g., the CMOS sensor or the CCD sensor) is input to the signal processing circuit 108. The signal processing circuit 108 transmits, based on the input electric signal, a video signal to the recording apparatus 114. The recording apparatus 114 records a moving image or a still image on a recording medium such as a magnetic tape or a semiconductor memory.

A microprocessor 116, which serves as a controller, controls entire operations of the imaging apparatus according to input from a zoom lens control unit 119, a diaphragm control unit 118, and a focus lens control unit 117, and from switches such as a power switch (not illustrated) and a recording switch (not illustrated). A memory 120 included in the microprocessor 116 is a random access memory (RAM), and can temporarily store data calculated by a program executed in the microprocessor 116.

The zoom lens control unit 119 drives the stepping motor 109 according to a positive phase/negative phase signal which is output from the microprocessor 116 and input to the stepping motor driving circuit 110. The diaphragm control unit 118 performs feedback control of the diaphragm circuit 113 so that an input luminance signal component is constantly an appropriate value. At this time, an output from the position detection element 112 is amplified and converted from an analog signal to a digital signal by an analog/digital (A/D) conversion circuit (not illustrated), and then input as information indicating an open/close position of the diaphragm to the microprocessor 116. Based on the input diaphragm position information, the diaphragm control unit 118 transmits an open/close signal to the diaphragm driving circuit 113 so that the luminance signal component constantly becomes an appropriate value, thereby controlling the diaphragm 103. The diaphragm control unit 118 can transmit, to the diaphragm driving circuit 113, an open/close signal for setting the diaphragm position at a predetermined open/close position.

The focus lens control unit 117, which serves as a controller, drives the focus lens 105 to the target position by controlling a focus driving circuit 111 functioning as a driving unit including a driving source. A plurality of position scales (to be described below) for detecting the position of the focus lens 105 is fixed to a holding frame of the focus lens 105, and a position sensor 115 feeds back the position information to form a servo control system. In the description of the present exemplary embodiment, the focus lens is assumed to be driven by a voice coil motor (VCM). However, other types of actuators such as a direct current (DC) motor may be used.

Figure 2:
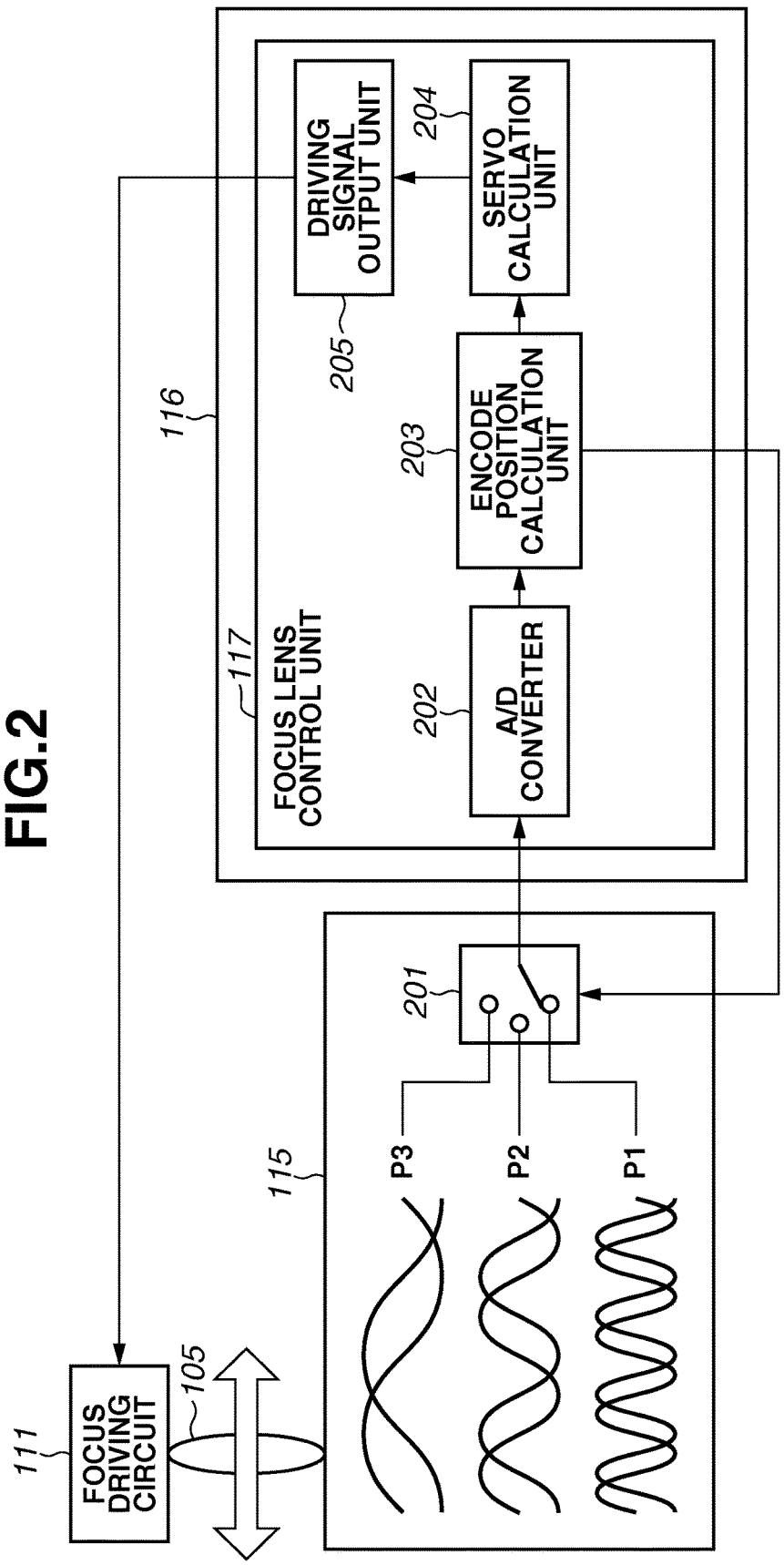
FIG. 2 is a block diagram illustrating an example of a position control apparatus according to the exemplary embodiment of the present invention.

The position sensor 115 and the focus lens control unit 117 will be described below with reference to FIG. 2. The position sensor 115 obtains incremental signals having three different periods (P1, P2, and P3) from a minimum signal. As position scales, which serve as a plurality of signal generation units for respectively generating signals having three different types of periods, scale patterns such as a magnetic pattern and a light reflection pattern are attached to the focus lens 105 in the optical axis direction. As a result, the three types of incremental signals can be generated by reading magnetic signals or light reflection signals each corresponding to the position of the scale (i.e., the position of the focus lens 105). A pitch switching unit 201, which serves as a signal selection unit, can switch between the three types of signals. According to the present exemplary embodiment, the incremental signals switched by the pitch switching unit 201 are output to the same signal line and transmitted to an encode position calculation unit 203 in the focus lens control unit 117 via an A/D converter 202. The encode position calculation unit 203 selects an encode signal by controlling the pitch switching unit 201. The encode position calculation unit 203 then encodes the incremental signal obtained from the A/D converter 202, and calculates the absolute position and the relative position of the focus lens 105 based on the execution result. A first calculation unit of the encode position calculation unit 203 calculates the relative position of the object using a first position detection signal (e.g., the incremental signal of a period P1). A second calculation unit calculates the relative position of the object using the first position detection signal and a second position detection signal (e.g., the incremental signal of a period P2). A third calculation unit calculates the absolute position of the object using at least three position detection signals (e.g., the incremental signals of periods P1, P2, and P3). In such a case, the third calculation unit calculates the absolute position of the object using at least three position detection signals when the object is in a stopped state.

The output from the encode position calculation unit 203 is transmitted to a servo calculation unit 204, and a driving signal output unit 205 is controlled, whereby the focus driving circuit 111 is controlled so as to control the focus lens 105. In other words, the focus lens control unit 117, which serves as a controller, drives the driving unit using the position calculation result of the position control target so as to control the position of the position control target. A position feedback system is formed as described above. According to the present exemplary embodiment, the example of switching between the three incremental signals P1, P2, and P3 is described. However, four or more incremental signals may be switched. The encode position calculation unit 203 controls the pitch switching unit 201 to control a pitch switching switch so as to switch between the incremental signals P1, P2, and P3 to be transmitted to the A/D converter 202. According to the present exemplary embodiment, a size relation between the periods P1, P2, and P3 satisfy P1<P2<P3.

Figure 3A:
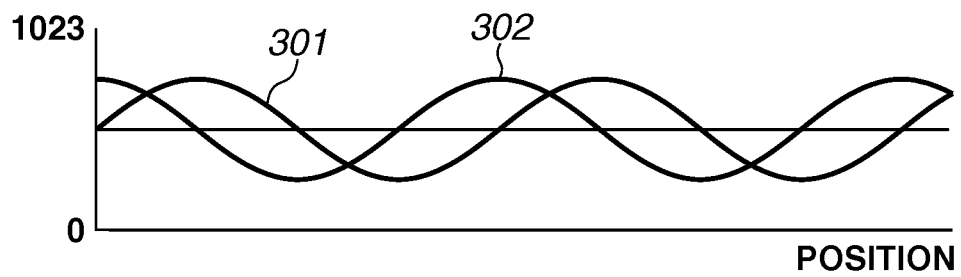
FIGS. 3A, 3B, and 3C are schematic diagrams illustrating processing of incremental signals.
Figure 3B:
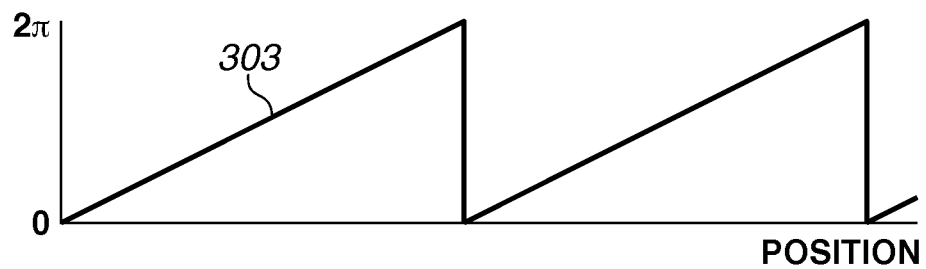
Figure 3C:
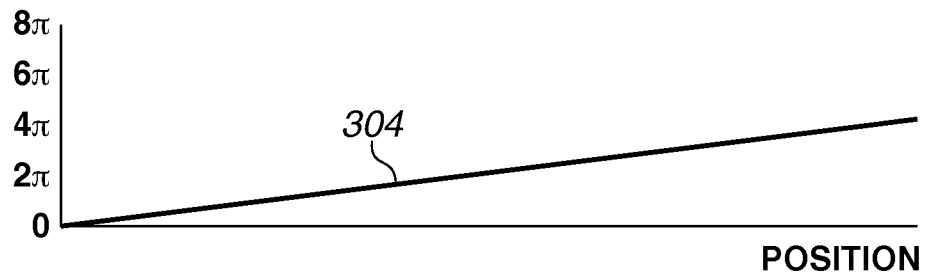

Incremental position encoding processing will be described below with reference to FIGS. 3A, 3B, 3C, and 4. FIGS. 3A, 3B, and 3C are schematic diagrams illustrating incremental signals. FIG. 4 is a flowchart illustrating the incremental position encoding processing performed by the encode position calculation unit 203. Referring to FIG. 3A, a 10-bit A/D conversion value is indicated on a vertical axis, and the position of the control target is indicated on a horizontal axis. FIG. 3A illustrates an image of two-phase incremental signals output as a sine wave 301 and a cosine wave 302 according to the movement. Referring to FIG. 3B, an angle in radian is indicated on the vertical axis and the position is indicated on the horizontal axis. A line 303 indicates an image of the result of calculation of the arc tangent function between the signal 301 and the signal 302, which has been normalized in a range from 0 to $2\pi$ according to the movement. Referring to FIG. 3C, an incremental position encode value is indicated on the vertical axis and the position is indicated on the horizontal axis. A line 304 indicates an image of the incremental position encode value which increases and decreases an upper digit of a value in which the least significant bit (LSB) corresponds to $2\pi$ when the arc tangent function results 303 are obtained across 0.

Referring to the flowchart of FIG. 4, in step S401, the A/D conversion values of the two-phase signals such as the signals 301 and 302 illustrated in FIG. 3A are obtained, and the processing proceeds to step S402. In step S402, offset removal calculation, gain adjustment calculation, and the arc tangent function calculation are performed. The arc tangent function calculation result as indicated by the line 303 in FIG. 3B is stored in the RAM 120 in the microprocessor 116. The processing proceeds to step S403. In step S403, it is determined whether the previous arc tangent function calculation result and the current arc tangent function calculation result are obtained across 0. If the results are obtained across 0 (YES in step S403), the processing proceeds to step S404.

In step S404, it is determined whether the current arc tangent function calculation result is smaller than the previous arc tangent function calculation result. If the current arc tangent function calculation result is smaller (YES in step S404), the processing proceeds to step S405. If the current arc tangent function calculation result is not smaller (NO in step S404), the processing proceeds to step S406. In step S405, the upper digit in $2\pi$ unit is incremented by 1, and the processing proceeds to step S407. More specifically, the upper digit is the digit of $2\pi$ or larger in the incremental position encode value. In step S406, the upper digit in $2\pi$ unit is decremented by 1, and the processing proceeds to step S407. In step S407, the upper digit in $2\pi$ unit and the current arc tangent function calculation result are added to obtain a new incremental position encode value as indicated by the line 304 in FIG. 3C. The processing then ends.

Absolute position encoding processing will be described below with reference to FIGS. 5A to 5F, and 6. FIGS. 5A to 5F are schematic diagrams illustrating three types of incremental signals having different periods and calculated signals. FIG. 6 is a flowchart illustrating the absolute position encoding processing performed by the encode position calculation unit 203.

Figure 5A:
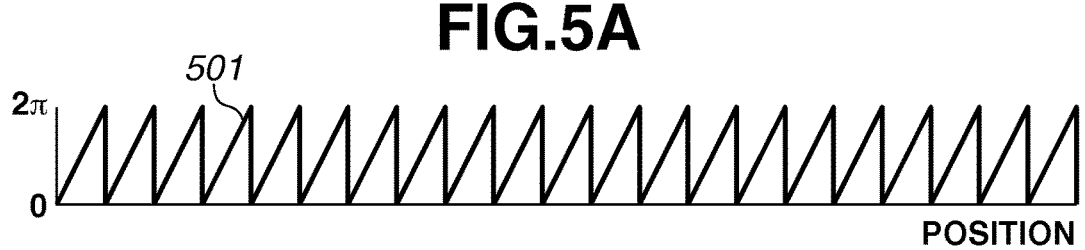
FIGS. 5A, 5B, 5C, 5D, 5E, and 5F are schematic diagrams illustrating incremental signals and calculated signals.
Figure 5B:
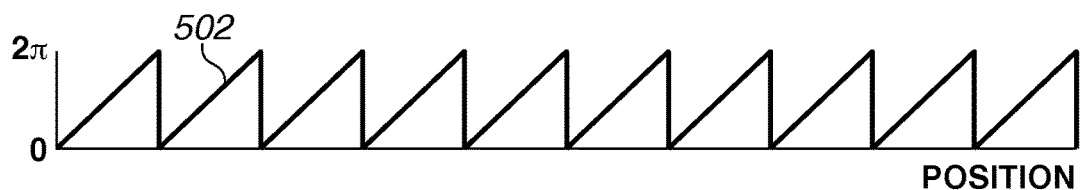
Figure 5C:
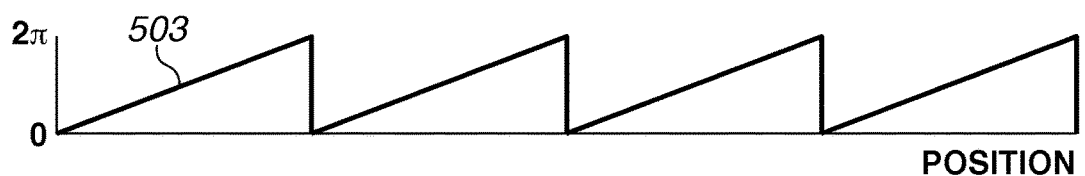
Figure 5D:
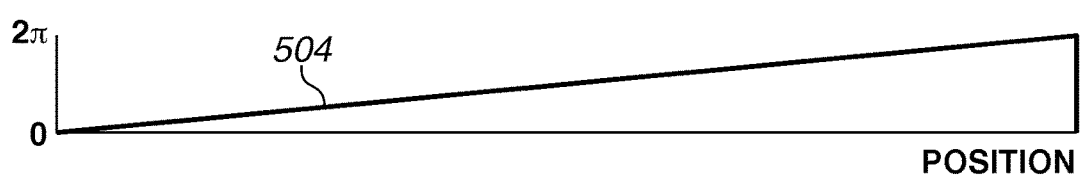
Figure 5E:
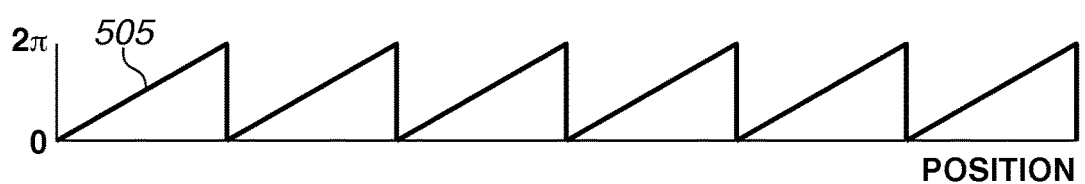
Figure 5F:
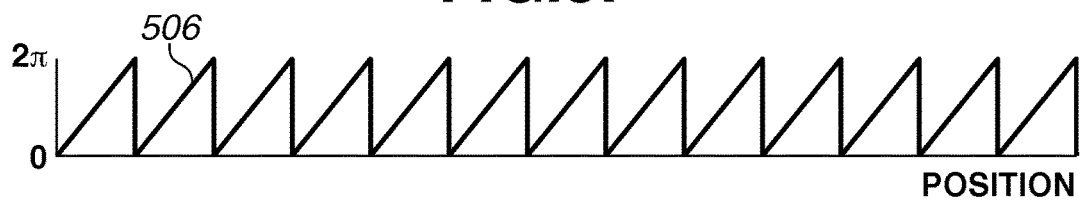
Figure 6:
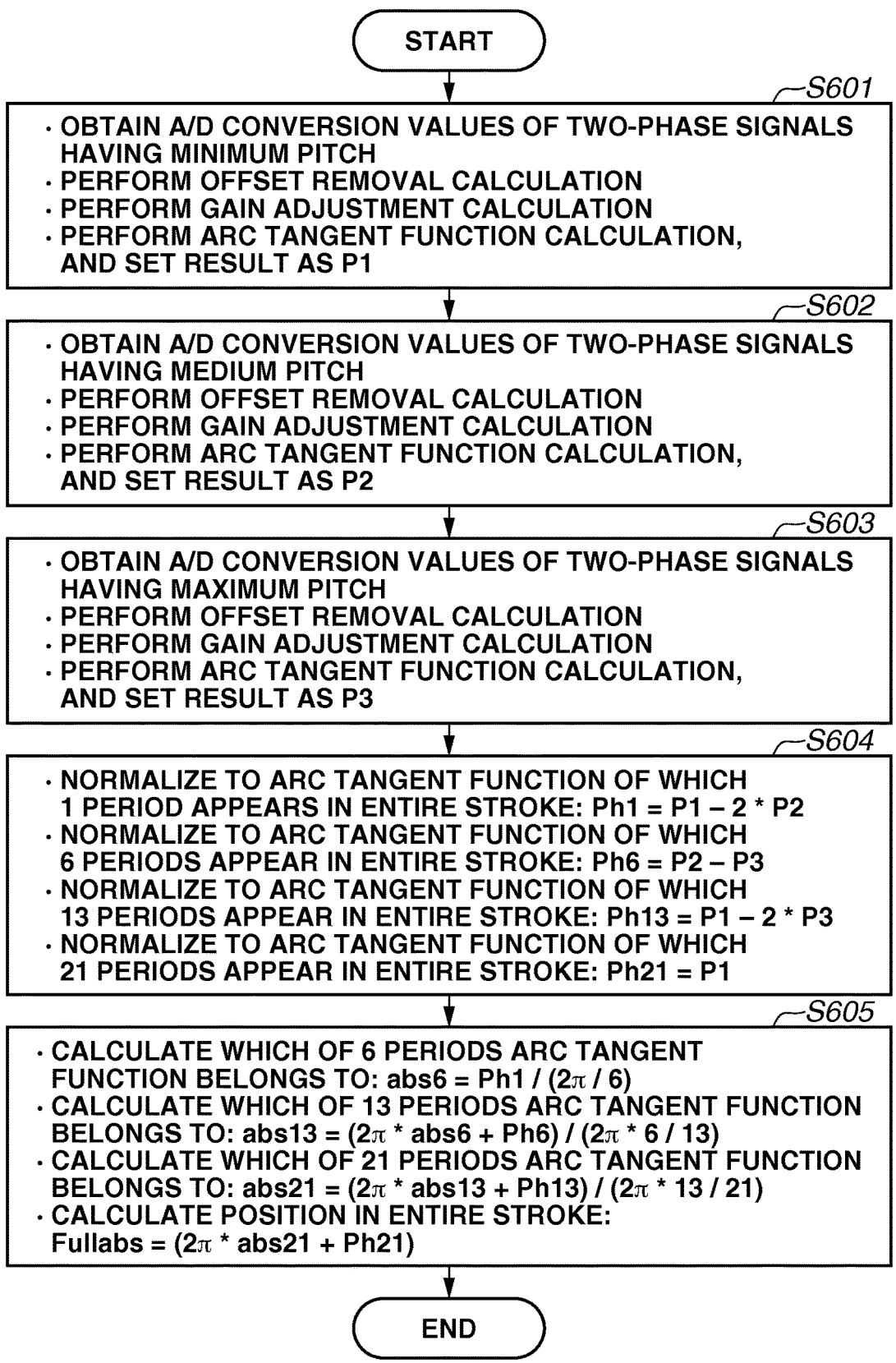
FIG. 6 is a flowchart illustrating absolute position calculation according to the exemplary embodiment.

Referring to FIG. 5A, the angle in radian is indicated on the vertical axis and the position is indicated on the horizontal axis. A line 501 indicates an image of the arc tangent function calculation result of the minimum period that is normalized in the range from 0 to $2\pi$ and calculated as the arc tangent function according to the movement. Twenty-one periods appear in the entire stroke. Referring to FIG. 5B, the angle in radian is indicated on the vertical axis and the position is indicated on the horizontal axis. A line 502 indicates an image of the arc tangent function calculation result of a medium period that is normalized in the range from 0 to $2\pi$ and calculated as the arc tangent function according to the movement. Ten periods appear in the entire stroke. Referring to FIG. 5C, the angle in radian is indicated on the vertical axis and the position is indicated on the horizontal axis. A line 503 indicates an image of the arc tangent function calculation result of the maximum period that is normalized in the range from 0 to $2\pi$ and calculated as the arc tangent function according to the movement. Four periods appear in the entire stroke. Referring to FIG. 5D, the angle in radian is indicated on the vertical axis and the position is indicated on the horizontal axis. A line 504 indicates an image of a result that is normalized in the range from 0 to $2\pi$ and calculated as a result of the following Equation (1) in step S604 of the flowchart illustrated in FIG. 6, according to the movement. One period appears in the entire stroke. Referring to FIG. 5E, the angle in radian is indicated on the vertical axis and the position is indicated on the horizontal axis. A line 505 indicates an image of a result that is normalized in the range from 0 to $2\pi$ and calculated as a result of the following Equation (2) in step S604 of the flowchart illustrated in FIG. 6, according to the movement. Six periods appear in the entire stroke. Referring to FIG. 5F, the angle in radian is indicated on the vertical axis and the position is indicated on the horizontal axis. A line 506 indicates an image of a result that is normalized in the range from 0 to $2\pi$ and calculated as a result of the following Equation (3) in step S604 of the flowchart illustrated in FIG. 6, according to the movement. Thirteen periods appears in the entire stroke.

Referring to the flowchart of the absolute position encoding processing illustrated in FIG. 6, in step S601, the output values of the A/D converter 202 of the two-phase signals of the minimum period that are stored in the memory 120 in the microprocessor 116 are obtained. The offset removal calculation and the gain adjustment calculation are then performed, and the arc tangent function calculation is performed to obtain the result as indicated by the line 501 in FIG. 5A. The calculated result is stored in the memory 120 as P1, and the processing proceeds to step S602. In step S602, the output values of the A/D converter 202 of the two-phase signals of the medium period that are stored in the memory 120 are obtained. The offset removal calculation and the gain adjustment calculation are then performed, and the arc tangent function calculation is performed to obtain the result as indicated by the line 502 in FIG. 5B. The calculated result is stored in the memory 120 as P2, and the processing proceeds to step S603. In step S603, the A/D converter values of the two-phase signals of the maximum period that are stored in the memory 120 are obtained. The offset removal calculation and the gain adjustment calculation are then performed, and the arc tangent function calculation is performed to obtain the result as indicated by the line 503 in FIG. 5C. The calculated result is stored in the memory 120 as P3, and the processing proceeds to step S604.

In step S604, Ph1 is obtained using P1 and P2 stored in the memory 120 according to Equation (1), and then the obtained Ph1 is stored in the memory 120. One period of Ph1 appears in the entire stroke. Further, Ph6 is obtained using P2 and P3 stored in the memory 120 according to Equation (2), and then the obtained Ph6 is stored in the memory 120. Six periods of Ph6 appear in the entire stroke. Furthermore, Ph13 is obtained using P1 and P3 stored in the memory 120 according to Equation (3), and then the obtained Ph13 is stored in the memory 120. Thirteen periods of Ph13 appear in the entire stroke. Moreover, P1 stored in the memory 120 is stored as Ph21 in the memory 120, and the processing proceeds to step S605. Twenty-one periods of Ph21 appear in the entire stroke.

In step S605, according to Equation (4), Ph1 stored in the memory 120 is used to calculate which of the 6 periods appearing in the entire stroke the arc tangent function belongs to, and the result is stored as abs6 in the memory 120. Further, according to Equation (5), abs6 and Ph6 stored in the memory 120 are used to calculate which of the 13 periods appearing in the entire stroke the arc tangent function belongs to, and the result is stored as abs13 in the memory 120. Furthermore, according to Equation (6), abs13 and Ph13 stored in the memory 120 are used to calculate which of the 21 periods appearing in the entire stroke the arc tangent function belongs to, and the result is stored as abs21 in the memory 120. Moreover, according to Equation (7), abs21 and Ph21 stored in the memory 120 are used to calculate the position at a resolution of the minimum period, and the result is stored as Fullabs in the memory 120. The processing then ends.

$$Ph=P1-2\times P2 \qquad \text{Equation (1)}$$

$$Ph6=P2-P3 \qquad \text{Equation (2)}$$

$$Ph13=P1-2\times P3 \qquad \text{Equation (3)}$$

$$abs6=Ph1/(2\pi/6) \qquad \text{Equation (4)}$$

$$abs13=(2\pi \times abs6+Ph6)/(2\pi \times 6/13) \quad \text{Equation (5)}$$

$$abs21=(2\pi \times abs13+Ph13)/(2\pi \times 13/21) \quad \text{Equation (6)}$$

$$Fullabs=(2\pi \times abs21+Ph21) \quad \text{Equation (7)}$$

As described above, the three types of incremental signals having different periods are used so as to further generate incremental signals having different periods. The absolute position encoding processing is performed by using the incremental signals having different periods that are obtained in a state where a control target object remains at rest. As a result, the absolute position at the resolution of the minimum period can be obtained.

Figure 7:
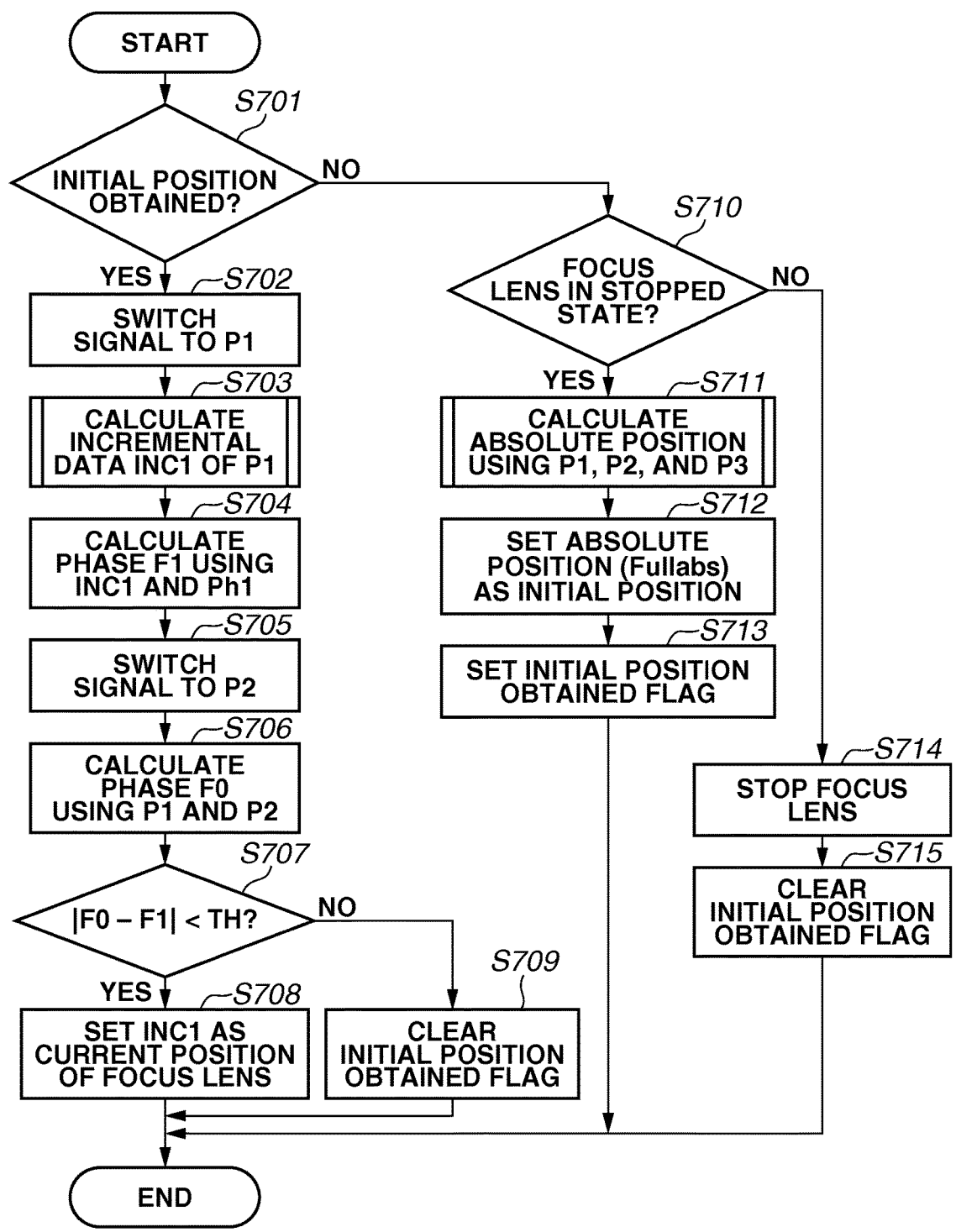
FIG. 7 is a flowchart illustrating position detection processing according to the exemplary embodiment.

A position detection method and an error detection method, which play the most characteristic role in the present exemplary embodiment, will be described below with reference to the flowchart illustrated in FIG. 7. The processing illustrated in FIG. 7 is repeatedly performed with every predetermined period. First, in step S701, it is determined whether an initial position of the imaging apparatus main body after the imaging apparatus is activated has been obtained (it is determined based on an initial position obtained flag to be described below). If the initial position has been obtained (YES in step S701), the processing proceeds to step S702. If the initial position has not been obtained (NO in step S701), the processing proceeds to step S710.

The processes from steps S710 to S715 are performed for obtaining the initial position after the imaging apparatus main body is activated. In step S710, it is determined whether the focus lens 105, which is a position detection target, is in the stopped state. If the focus lens 105 is in the stopped state (YES in step S710), the processing proceeds to step S711, and if the focus lens 105 is not in the stopped state (NO in step S710), the processing proceeds to step S714. In step S714, processing for stopping the focus lens 105 is performed. In step S715, the initial position obtained flag is set. If it is determined that the focus lens 105 is in the stopped state (YES in step S710), the processing proceeds to step S711. In step S711, a subroutine of the absolute position encoding processing described above with reference to FIGS. 5A to 5F, and 6 is performed, and the obtained absolute position Fullabs is stored in the memory 120 in the microprocessor 116. Then, the processing proceeds to step S712. In step S712, the absolute position Fullabs obtained in step S711 is set as the initial position of the focus lens 105. The set initial position is used as an initial counter position of an incremental counter of P1 and P2 to be used in the description of steps S702 to S709 to be described below. The initial position obtained flag is then set in step S713, and the processing ends.

If it is determined in step S701 that the initial position has been obtained, the processing proceeds to step S702. In step S702, the encode position calculation unit 203 causes the pitch switching unit 201 to switch to P1. Then, the processing proceeds to step S703, and the subroutine of the incremental position encoding processing described with reference to FIGS. 3A, 3B, 3C, and 4 is performed. An encode position INC1 of the focus lens 105 obtained using P1 is stored in the memory 120 in the microprocessor 116, and the processing proceeds to step S704.

Figure 8A:
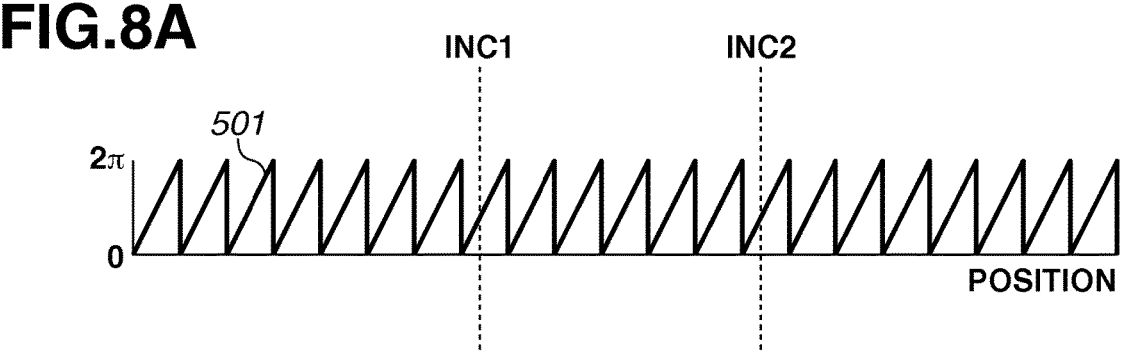
FIGS. 8A, 8B, and 8C are schematic diagrams illustrating phase relations of incremental signals and a calculated signal.
Figure 8B:
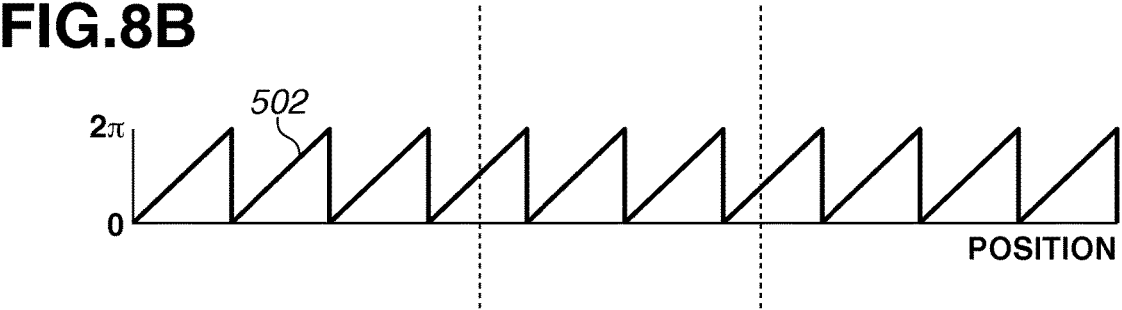
Figure 8C:
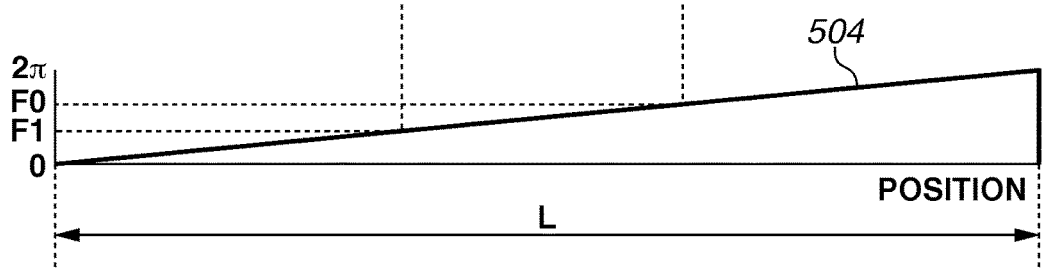

The processes in steps S704 to S705 will be described below with reference to FIGS. 8A, 8B, and 8C. In step S704, a phase of an incremental counter of Ph1 corresponding to the encode position INC1 calculated in step S703 is indicated as a phase F1. When a start position of the incremental counter is set at the 0 coordinate, the phase F1 at a position X1 can be obtained based on the relation with a stroke L corresponding to 1 period of Ph1, according to the following Equation (8).

$$F1=2\pi \times (X1/L) \quad \text{Equation (8)}$$

Then, the processing proceeds to step S705. In step S705, the pitch switching unit 201 is switched to P2, and an encode position INC2 of the focus lens 105 obtained using P2 is stored in the memory 120 in the microprocessor 116. Then, the processing proceeds to step S706. In step S706, a phase F0 of Ph1 which is obtained using P1 and P2 according to Equation (1) is calculated. Then, the processing proceeds to step S707.

In step S707, the size relation between F0 and F1 is determined according to the following Equation (9).

$$|F0-F1|<TH \quad \text{Equation (9)}$$

In Equation (9), TH indicates a threshold value (to be described below). The process in step S707 is performed so as to determine that that an encode error has occurred in a case where the value of the phase F1 obtained from the encode position INC1, i.e., the encode position obtained from P1 is greatly different from the value of the phase F0 obtained from P1 and P2.

An example of a method for determining the threshold value TH will be described below with reference to FIG. 9. FIG. 9 illustrates the processing performed by the pitch switching unit 201 for switching the incremental signal of P1 or P2, the conversion processing performed by the A/D converter 202, the calculation processing performed by the encode position calculation unit 203, and the comparison processing performed in step S707 arranged in chronological order. It is assumed that the A/D conversion value of P1 is obtained at a time T1, and the A/D conversion value of P2 is obtained at a time T2. The timings at which the A/D conversion values of P1 and P2 are obtained differ by $\Delta T$ (=T2−T1) due to the calculation time of the encode position calculation unit 203 and the timing of sampling performed by the A/D converter 202. If the focus lens 105, which is a measurement object, is moving at a speed V, the difference in a detection distance between INC1 and INC 2 is generated as a distance calculated by the speed V×$\Delta T$ (=$\Delta D$).

As a result, a change in phase when the moving distance is $\Delta D$ is calculated as TH according to the following Equation (10) using the stroke L corresponding to one period.

$$TH=\Delta D \times 2\pi/L \quad \text{Equation (10)}$$

In other words, the threshold value TH is the phase difference generated by the difference between the timings at which the A/D conversion values of P1 and P2 are obtained from the A/D converter 202.

If |F0−F1| is smaller than TH (YES in step S707), the processing proceeds to step S708. In step S708, the value of INC1 obtained in step S703 is set as the current position of the focus lens 105, and the processing ends. If |F0−F1| is not smaller than TH (NO in step S707), it is determined that an encode error has occurred, and the processing proceeds to step S709. In step S709, the initial position obtained flag is cleared, and the processing ends. In such a case, in a subsequent process, the processes in steps S710 to S715 are performed according to the determination result of step S701. The processing then proceeds to the processing for reading the absolute position, and thereinafter, the processing illustrated in the flowchart of FIG. 7 is repeated with the predetermined period.

Nevertheless, if the A/D conversion values of P1 and P2 are obtained when the focus lens 105 is in the stopped state, ΔT, i.e., ΔD, becomes 0. As a result, the above threshold TH becomes 0. In such a case, an appropriate predetermined value which is not zero is employed as a threshold TH according to required position control precision.

An exemplary embodiment of the present invention has been described above in detail. However, the present invention is not limited to the exemplary embodiment of the imaging apparatus, and various forms also constitute the present invention without departing from the scope of the present invention. Parts of the above described exemplary embodiment may be combined as appropriate. Further, a program of software realizing the functions of the above-described exemplary embodiment may be supplied directly from a recording medium or using wired or wireless communication to a system or an apparatus having a computer capable of executing the program. Execution of the program also constitutes the present invention. A program code which is supplied to and installed in the computer for realizing functional processing of the present invention using the computer also realizes the present invention. In other words, the computer program for realizing the functional processing of the present invention constitutes the present invention. Such a program is for performing position control of a position control target, and causes the computer to perform the above-described position control method.

According to an exemplary embodiment of the present invention, in controlling switching between incremental signals having different periods, technical effects of reducing a processing time and preventing an encode error can be obtained.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007761 filed Jan. 20, 2014, which is hereby incorporated by reference herein in its entirety.

What is claimed is:

1. A position control apparatus comprising:
a signal generation unit configured to generate at least three position detection signals which have different periods that change according to movement of a position control target;
a signal selection unit configured to switch among the position detection signals, and output the position detection signals to one or more signal lines less than the number of position detection signals;
a first calculation unit configured to calculate a relative position of the position control target using a first position detection signal among the position detection signals;
a second calculation unit configured to calculate a relative position of the position control target using a second position detection signal and the first position detection signal among the position detection signals;
a third calculation unit configured to calculate an absolute position of the position control target using at least three position detection signals among the position detection signals; and
a controller comprising a microprocessor configured to drive a driving unit and control a position of the position control target, using a position calculation result of the position control object,
wherein the controller controls a position of the position control target using a position calculation result of the first calculation unit, and in a case where a predetermined relation is not established between position calculation results of the first calculation unit and the second calculation unit, causes the third calculation unit to calculate the absolute position, and corrects the position calculation result of the first calculation unit using a position calculation result of the third calculation unit.

2. The position control apparatus according to claim 1, wherein the first position detection signal is a position detection signal which changes with a shortest period among the position detection signals.

3. The position control apparatus according to claim 1, wherein the second position detection signal is a position detection signal which changes with a second shortest period among the position detection signals.

4. The position control apparatus according to claim 1, wherein the predetermined relation is a phase relation between the relative position of the position control target that is calculated by the first calculation unit and the relative position of the position control target that is calculated by the second calculation unit.

5. The position control apparatus according to claim 1, wherein, when the position control target is in a stopped state, the third calculation unit calculates the absolute position of the position control target using at least three position detection signals.

6. The position control apparatus according to claim 1, wherein the signal selection unit outputs the position detection signals to a same signal line.

7. The position control apparatus according to claim 1, wherein the signal generation unit includes a plurality of units configured to respectively generate three position detection signals having different periods.

8. The position control apparatus according to claim 1, wherein the first calculation unit, the second calculation unit, and the third calculation unit are arranged on a single chip.

9. The position control apparatus according to claim 1, wherein the first calculation unit, the second calculation unit, and the third calculation unit are realized by a same unit.

10. A lens control apparatus comprising:
a lens unit; and
the position control apparatus according to claim 1.

11. A position control method comprising:
switching among at least three position detection signals which have different periods that change according to movement of a position control target, and
outputting the position detection signals to one or more signal lines less than the number of position detection signals;
performing first calculation of a relative position of the position control target using a first position detection signal among the position detection signals;
performing second calculation of a relative position of the position control target using a second position detection signal and the first position detection signal among the position detection signals;
performing third calculation of an absolute position of the position control target using at least three position detection signals among the position detection signals; and
controlling a position of the position control target using a position calculation result of the position control target,
wherein, in the controlling, a position of the position control target is controlled using a position calculation result of the first calculation, and in a case where a predetermined relation is not established between position calculation results of the first calculation and the second calculation, the third calculation is performed and the position calculation result of the first calculation is corrected using a position calculation result of the third calculation.

12. The position control method according to claim 11, wherein the predetermined relation is a phase relation between the relative position of the position control target that is the calculation result of the first calculation and the relative position of the position control target that is the calculation result of the second calculation.

13. The position control method according to claim 11, wherein, in the third calculation, when the position control target is in a stopped state, an absolute position of the position control target is calculated using at least three position detection signals.

14. A non-transitory computer-readable storage medium storing a program for causing a computer to perform the position control method according to claim 11.

* * * * *